United States Patent
Chang et al.

(10) Patent No.: US 10,680,511 B2
(45) Date of Patent: Jun. 9, 2020

(54) DC-DC CONVERTING CONTROLLER

(71) Applicant: uPI semiconductor corp., Zhubei, Hsinchu County (TW)

(72) Inventors: Chih-Lien Chang, Zhubei (TW); Pei-Ling Hong, Zhubei (TW); Cheng-Ching Hsu, Zhubei (TW)

(73) Assignee: UPI SEMICONDUCTOR CORP., Zhubei, Hsinchu County (TW)

( * ) Notice: Subject to any disclaimer, the term of this patent is extended or adjusted under 35 U.S.C. 154(b) by 0 days.

(21) Appl. No.: 16/253,307

(22) Filed: Jan. 22, 2019

(65) Prior Publication Data

US 2019/0252982 A1    Aug. 15, 2019

(30) Foreign Application Priority Data

Feb. 12, 2018  (TW) .............................. 107105063 A

(51) Int. Cl.
*H02M 3/04*    (2006.01)
*H02M 1/00*    (2006.01)
*H02M 3/156*   (2006.01)
*H02M 3/158*   (2006.01)

(52) U.S. Cl.
CPC ............ *H02M 3/04* (2013.01); *H02M 3/1584* (2013.01); *H02M 2001/0009* (2013.01); *H02M 2001/0025* (2013.01); *H02M 2003/1566* (2013.01)

(58) Field of Classification Search
CPC . H02M 2001/0009; H02M 2001/0019; H02M 2001/0025; H02M 3/155; H02M 3/1584; H02M 2003/1566
See application file for complete search history.

(56) References Cited

U.S. PATENT DOCUMENTS

| | | | |
|---|---|---|---|
| 6,465,993 B1* | 10/2002 | Clarkin | H02M 3/156 323/272 |
| 8,072,200 B1 | 12/2011 | Qiu et al. | |
| 8,917,077 B2 | 12/2014 | Lin et al. | |
| 9,203,315 B2* | 12/2015 | Torti | G01R 29/16 |
| 9,419,518 B2* | 8/2016 | Tuten | H02M 3/156 |
| 9,419,627 B2* | 8/2016 | Guthrie | H03L 5/00 |
| 9,887,626 B2* | 2/2018 | Chen | H02M 1/08 |
| 10,044,273 B2* | 8/2018 | Gherghescu | H02M 3/1584 |
| 2005/0194952 A1* | 9/2005 | Carpenter | H02M 3/156 323/283 |

(Continued)

*Primary Examiner* — Fred E Finch, III
(74) *Attorney, Agent, or Firm* — McClure, Qualey & Rodack, LLP

(57) ABSTRACT

A DC-DC converting controller is disclosed. The DC-DC controller includes a current sensing unit, a parameter setting pin, a parameter setting unit and an error amplifier. The current sensing unit provides a sensing current. The parameter setting pin is coupled to an external parameter setting unit. The parameter setting unit is coupled to the current sensing unit and the parameter setting pin. The parameter setting unit has an internal parameter setting unit. The parameter setting unit generates a droop current according to the external parameter setting unit and the sensing current. The error amplifier includes a first input terminal and a second input terminal. The first input terminal receives an output feedback voltage and the second input terminal receives a first reference voltage. The second input terminal is coupled to a terminal of the internal parameter setting unit.

10 Claims, 2 Drawing Sheets

(56) References Cited

U.S. PATENT DOCUMENTS

| | | | | |
|---|---|---|---|---|
| 2008/0169797 A1* | 7/2008 | Zambetti | ............ | H02M 3/1584 |
| | | | | 323/285 |
| 2015/0222183 A1* | 8/2015 | Karlsson | ............... | H02M 3/156 |
| | | | | 323/271 |
| 2016/0141956 A1* | 5/2016 | Dong | .................... | H02M 3/157 |
| | | | | 323/271 |
| 2019/0245447 A1* | 8/2019 | Chang | ..................... | H02M 1/14 |

\* cited by examiner

DC-DC CONVERTING CONTROLLER

BACKGROUND OF THE INVENTION

1. Field of the Invention

The invention relates to power conversion; in particular, to a DC-DC converting controller.

2. Description of the Prior Art

In general, in order to avoid load damage caused by a large instantaneous current when the load is switched from light load to heavy load (e.g., pumping), the conventional DC-DC converting controller usually provides a load line droop function.

As shown in FIG. 1, the conventional DC-DC converting controller 1 usually couples an external resistor RDRP between its pin DAC and pin EAP and changes the load line drop voltage by adjusting the external resistor RDRP. In turn, the function of dynamically adjusting the output voltage with changes in external load current is achieved. Further, the pin DAC is used to transmit an output current IOUT through the external resistor RDRP to generate a first reference voltage VEAP at the pin EAP and provide the first reference voltage VEAP to the error amplifier EA.

However, as the DC-DC converting controller 1 has more and more functions, the number of pins required is also increased, because the external resistor RDRP coupled between the pin DAC and the pin EAP occupies the two pins DAC and EAP at one time, so that the two pin DAC and EAP fail to provide other functions.

In addition, the conventional DC-DC converting controller 1 further includes output current summing pins CSPSUM and CSNSUM for summing the output currents of different phases, and the output current summing pins CSPSUM and CSNSUM are also coupled to a thermistor NTC to provide temperature compensation for the output current. All of the above phenomena will cause a waste of the number of pins in the conventional DC-DC conversion controller, and the number of pins is not enough. This phenomenon needs to be improved.

SUMMARY OF THE INVENTION

Therefore, the invention provides a DC-DC converting controller to effectively solve the above-mentioned problems in the prior art.

An embodiment of the invention is a DC-DC converting controller. In this embodiment, the DC-DC converting controller includes a current sensing unit, a parameter setting pin, a parameter setting unit and an error amplifier. The current sensing unit provides a sensing current. The parameter setting pin is coupled to an external parameter setting unit. The parameter setting unit is coupled to the current sensing unit and the parameter setting pin. The parameter setting unit has an internal parameter setting unit.

The parameter setting unit generates a droop current according to the external parameter setting unit and the sensing current. The error amplifier includes a first input terminal and a second input terminal. The first input terminal receives an output feedback voltage and the second input terminal receives a first reference voltage. The second input terminal is coupled to a terminal of the internal parameter setting unit.

In an embodiment of the invention, another terminal of the internal parameter setting unit receives the droop current and generates the first reference voltage at the one terminal of the internal parameter setting unit.

In an embodiment of the invention, the DC-DC converting controller includes a first current sensing pin, a current summing unit and a current output pin. The first current sensing pin senses a first output current. The current summing unit is coupled to the first current sensing pin and the current sensing unit and generates a summed current according to the first output current. The current output pin is coupled to the current summing unit and outputs the summed current.

In an embodiment of the invention, the current output pin is coupled to a thermistor to provide temperature compensation.

In an embodiment of the invention, the DC-DC converting controller includes an output reference pin coupled to the current summing unit and the thermistor respectively.

In an embodiment of the invention, the DC-DC converting controller further includes a second current sensing pin. The second current sensing pin senses a second output current. The current summing unit is also coupled to the second current sensing pin and generates the summed current according to the first output current and the second output current.

In an embodiment of the invention, the current summing unit includes a first voltage follower, and the first voltage follower includes a first input terminal, a second input terminal and an output terminal. The second input terminal is coupled to the current output terminal, the first input terminal is coupled to the output terminal, and the output terminal is coupled to the parameter setting unit.

In an embodiment of the invention, the current summing unit includes a second voltage follower, and the second voltage follower includes a first input terminal, a second input terminal and an output terminal. The second input terminal is coupled to a second reference voltage, the first input terminal is coupled to the output terminal and the parameter setting unit, and the output terminal is coupled to the output reference pin.

In an embodiment of the invention, the parameter setting unit further includes a current mirror. The current mirror replicates a plurality of droop currents according to a setting signal and outputs the plurality of droop currents.

In an embodiment of the invention, the parameter setting unit further includes an analog-to-digital converter. The analog-to-digital converter is coupled between the parameter setting pin and the current mirror and generates the setting signal to the current mirror according to a setting voltage of the parameter setting pin.

In an embodiment of the invention, the parameter setting unit further includes a look-up table. The parameter setting unit cooperates with the look-up table to generate the setting signal to the current mirror according to a setting voltage of the parameter setting pin.

In an embodiment of the invention, the error amplifier generates a compensation signal according to the output feedback voltage and the first reference voltage.

Compared to the prior art, the DC-DC converting controller of the invention integrates the conventional pins DAC and EAP in FIG. 1 and the external resistor RDRP coupled between the pins DAC and EAP into its interior to save the number of pins, and utilizes the multi-function pin coupled to ground through an external resistor to perform parameter setting to adjust the load current ratio, so that the output voltage can be dynamically adjusted. In addition, the DC-DC converting controller of the invention internally sums the output current of each phase and then supplies the summed current to the current mirror or outputs the summed current from the current output pin IMON, so that the conventional output current summing pins CSPSUM and CSNSUM can be canceled to further save the number of pins. The thermistor NTC, which is originally coupled to the output current summing pins CSPSUM and CSNSUM, is coupled between the current output pin IMON and the output reference pin REFOUT to provide a temperature compensation function for the output current.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

Figure 1:
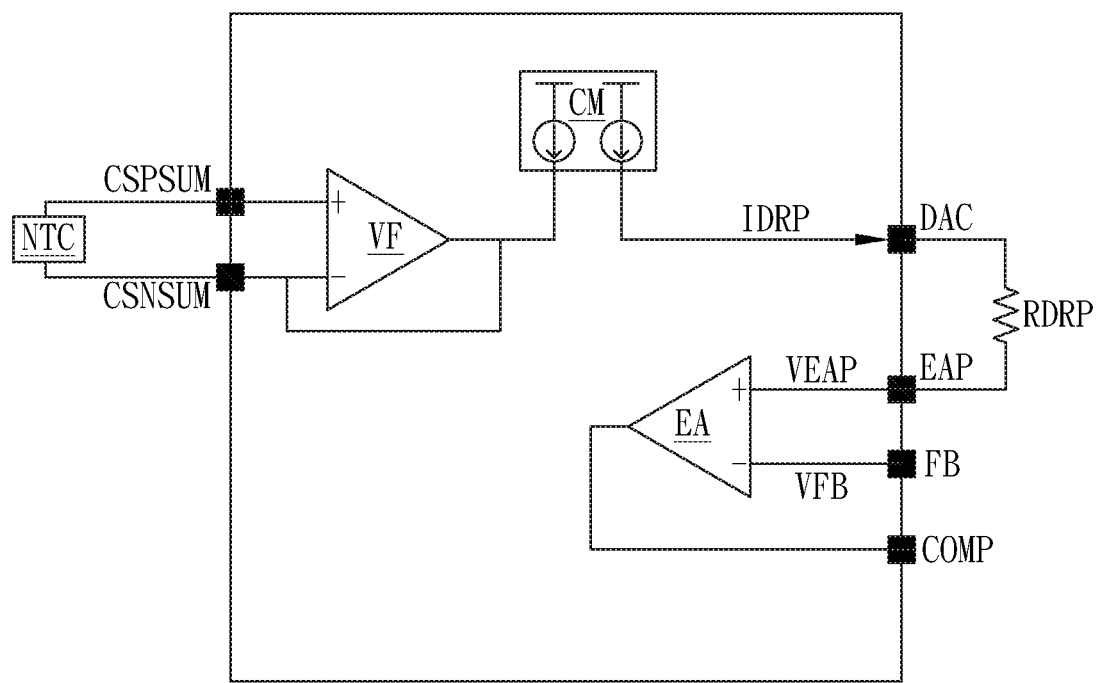
FIG. 1 illustrates a schematic diagram of the conventional DC-DC converting controller 1.

Exemplary embodiments of the present invention are referenced in detail now, and examples of the exemplary embodiments are illustrated in the drawings. Further, the same or similar reference numerals of the elements/components in the drawings and the detailed description of the invention are used on behalf of the same or similar parts.

An embodiment of the invention is a DC-DC converting controller. In this embodiment, the DC-DC converting controller integrates the conventional external resistor RDRP and the pins DAC and EAP at both terminals of the external resistor RDRP into its interior and eliminates the conventional output current summing pins CSPSUM and CSNSUM, so that it can effectively save the number of pins to provide free pins for other functions.

Figure 2:
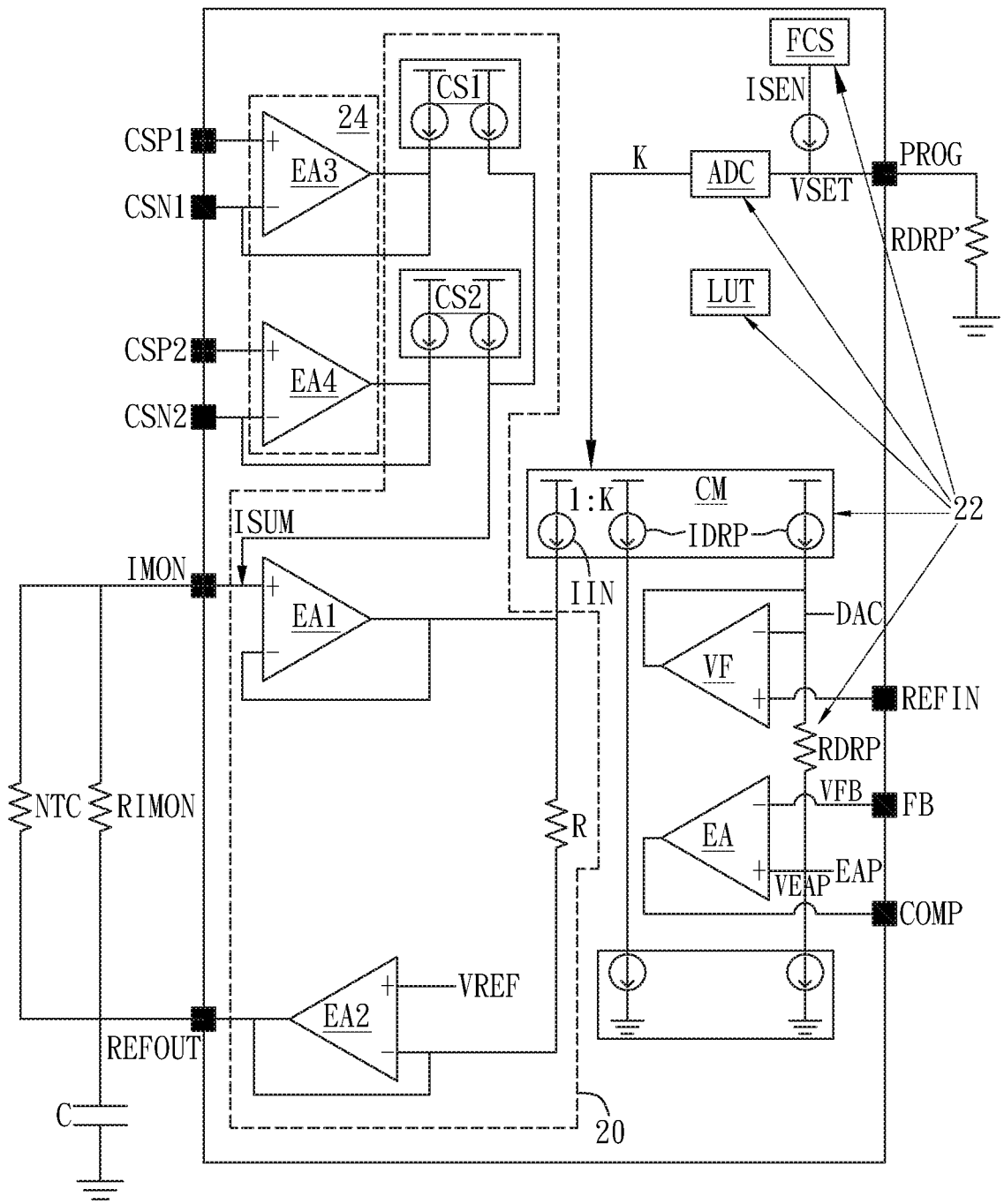
FIG. 2 illustrates a schematic diagram of the DC-DC converting controller 2 in an embodiment of the invention.

Please refer to FIG. 2. FIG. 2 illustrates a schematic diagram of the DC-DC converting controller 2 in this embodiment. As shown in FIG. 2, the DC-DC converting controller 2 can include a current summing unit 20, a parameter setting unit 22, a current sensing unit 24, an error amplifier EA, a parameter setting pin PROG, a current output pin IMON, an output reference pin REFOUT, a first current sensing pin CSP1/CSN1, a second current sensing pin CSP2/CSN2, a feedback pin FB, a compensation pin COMP and an input reference pin REF IN.

In this embodiment, the first current sensing pin CSP1/CSN1 is used to sense a first output current of a first phase and a second current sensing pin CSP2/CSN2 is used to sense the second output current of a second phase. The current sensing unit 24 can include a third voltage follower EA3 and a fourth voltage follower EA4. A positive input terminal+ and a negative input terminal− of the third voltage follower EA3 are respectively coupled to the first current sensing pin CSP1/CSN1, and the negative input terminal− and an output terminal of the third voltage follower EA3 are both coupled to the current summing unit 20. The third voltage follower EA3 is used to provide the first output current to the current summing unit 20. A positive input terminal+ and a negative input terminal− of the fourth voltage follower EA4 are respectively coupled to the second current sensing pin CSP2/CSN2, and the negative input terminal− and the output terminal of the fourth voltage follower EA4 are both coupled to the current summing unit 20. The fourth voltage follower EA4 is used to provide the second output current to the current summing unit 20.

The current summing unit 20 is coupled to the current sensing unit 24, the first current sensing pin CSN1, the second current sensing pin CSN2 and the current output pin IMON respectively and used to generate a summed current ISUM according to the first output current and the second output current and output the summed current ISUM through the current output pin IMON.

In this embodiment, the current summing unit 20 can include a first current source CS1, a second current source CS2, a first voltage follower EA1 and a second voltage follower EA2. The first current source CS1 is coupled to the output terminal of the third voltage follower EA3, the first current sensing pin CSN1, the current output pin IMON and the positive input terminal+ of the first voltage follower EA1. The second current source CS2 is coupled to the output terminal of the fourth voltage follower EA4, the second current sensing pin CSN2, the current output pin IMON and the positive input terminal+ of the first voltage follower EA1. That is to say, two current sources of the first current source CS1 are respectively coupled to the first current sensing pin CSN1 and the current output pin IMON; two current sources of the second current source CS2 are respectively coupled to the second current sensing pin CSN2 and current output pin IMON.

The positive input terminal+ of the first voltage follower EA1 is coupled to the current output pin IMON, the first current source CS1 and the second current source CS2 respectively. The output terminal of the first voltage follower EA1 is coupled to the negative input terminal− of the first voltage follower EA1, an input terminal of the current mirror CM and the resistor R respectively. The positive input terminal+ of the second voltage follower EA2 is coupled to the second reference voltage VREF. The negative input terminal− of the second voltage follower EA2 is coupled between the output terminal and the output reference pin REFOUT and coupled to the input terminal of the current mirror CM through the resistor R.

It can be seen from the above that the input terminal of the current mirror CM is coupled to the first voltage follower EA1, the second voltage follower EA2 and the resistor R respectively. Because the first voltage follower EA1 and the second voltage follower EA2 are coupled to two terminals of the resistor R respectively, an input current TIN can be generated and inputted to the input terminal of the current mirror CM according to a voltage difference between the first voltage follower EA1 and the second voltage follower EA2.

In practical applications, the DC-DC converting controller 2 can include N sets of current sensing pins for sensing output currents of N phase respectively, where N is a positive integer. Since the DC-DC converting controller 2 of the invention sums the output currents of different phases (e.g., the first output current of the first phase and the second output current of the second phase) into the summed current ISUM through the current summing unit 20 in its interior and then outputs the summed current ISUM through the current output pin IMON or provides the summed current ISUM to the current mirror CM through the first voltage follower EA1. Therefore, the pins CSPSUM and CSNSUM used for summing the output currents in the prior art can be cancelled to effectively save the number of pins and allows the free pins to be used for other functions.

The current output pin IMON and the output reference pin REFOUT can be externally coupled with a thermistor NTC (e.g., a negative temperature coefficient thermistor, but not limited to this) to provide temperature compensation function to the summed current outputted by the current output pin IMON, so that the thermistor NTC coupled to the pins CSPSUM and CSNSUM in FIG. 1 can be replaced. In addition, the current output pin IMON can be grounded through the resistor RIMON and the capacitor C coupled in series to filter out the noise.

In this embodiment, the parameter setting unit 22 can include a set current source FCS, an analog-to-digital converter ADC, a current mirror CM and an internal parameter setting unit RDRP. The analog-to-digital converter ADC is coupled between the parameter setting pin PROG and the current mirror CM; the internal parameter setting unit RDRP is coupled to the output terminal of the current mirror CM; the setting current source FCS is coupled between the analog-to-digital converter ADC and the parameter setting pin PROG.

The parameter setting pin PROG can be externally coupled to an external parameter setting unit RDRP' (e.g., an external resistor, but not limited to this) and can be grounded through the external parameter setting unit RDRP' to perform parameter setting to adjust the amplification ratio of the summed current ISUM. During the initial period of the IC, the setting current source FCS provides a set current IF having a fixed value to the parameter setting pin PROG and cooperates with the external setting resistor RDRP' to generate a setting voltage VSET at the parameter setting pin PROG. The analog-to-digital converter ADC generates a setting signal K to the current mirror CM according to the setting voltage VSET to adjust the magnification of the current mirror CM. When the IC starts operation, the setting signal K remains its original setting. The setting current source FCS, the analog-to-digital converter ADC and the external parameter setting unit RDRP' no longer work.

In the foregoing, when the input terminal of the current mirror CM receives the input current IIN, the current mirror CM will generate a plurality of droop currents IDRP according to the input current TIN and to the amplification set according to the setting signal K and then output the droop currents through the output terminal of the current mirror CM.

In practical applications, the parameter setting unit 22 can not only generate the setting signal K through the analog-to-digital converter ADC, but also cooperate with a look-up table LUT to generate the setting signal K to the current mirror CM according to the set voltage VSET during the initial period of the IC.

The internal parameter setting unit RDRP in the parameter setting unit 22 has a first terminal DAC and a second terminal EAP. The first terminal DAC of the internal parameter setting unit RDRP receives the droop current IDRP outputted by the output terminal of the current mirror CM and generates a first reference voltage VEAP at the second end EAP of the internal parameter setting unit RDRP.

The internal parameter setting unit RDRP can be an internal resistor, and the first terminal DAC and the second terminal EAP of the internal parameter setting unit RDRP correspond to the conventional pins DAC and EAP in FIG. 1. Since the internal parameter setting unit RDRP and its the first terminal DAC and the second terminal EAP are integrated into the DC-DC converting controller 2, the number of pins of the DC-DC converting controller 2 can be effectively saved.

The positive input terminal+ and the negative input terminal− of the error amplifier EA are coupled to the second terminal EAP of the internal parameter setting unit RDRP and the feedback pin FB respectively. The positive input terminal+ of the error amplifier EA receives the first reference voltage VEAP from the second terminal EAP of the internal parameter setting unit RDRP and the negative input terminal− of the error amplifier EA receives an output feedback voltage VFB from the feedback pin FB. The error amplifier EA generates a compensation signal COMP according to the received output feedback voltage VFB and first reference voltage EAP and outputs the compensation signal COMP through the compensation pin COMP.

In practical applications, the DC-DC converting controller 2 can further include a voltage follower VF. The positive input terminal+ of the voltage follower VF is coupled to an input reference pin REFIN and the negative input terminal− and the output terminal of the voltage follower VF are coupled to the first terminal DAC of the internal parameter setting unit RDRP.

Compared to the prior art, the DC-DC converting controller of the invention integrates the conventional pins DAC and EAP in FIG. 1 and the external resistor RDRP coupled between the pins DAC and EAP into its interior to save the number of pins, and utilizes the multi-function pin coupled to ground through an external resistor to perform parameter setting to adjust the load current ratio, so that the output voltage can be dynamically adjusted. In addition, the DC-DC converting controller of the invention internally sums the output current of each phase and then supplies the summed current to the current mirror or outputs the summed current from the current output pin IMON, so that the conventional output current summing pins CSPSUM and CSNSUM can be canceled to further save the number of pins. The thermistor NTC, which is originally coupled to the output current summing pins CSPSUM and CSNSUM, is coupled between the current output pin IMON and the output reference pin REFOUT to provide a temperature compensation function for the output current.

What is claimed is:

1. A DC-DC converting controller, comprising:
   a current sensing circuit configured to provide a sensing current;
   a droop parameter setting pin coupled to an external droop parameter setting circuit;
   a droop current generation circuit coupled to the current sensing circuit and the droop parameter setting pin, wherein the droop current generation circuit is configured to generate a droop current according to the external droop parameter setting circuit and the sensing current; and
   an error amplifier comprising a first input terminal and a second input terminal, wherein the first input terminal receives an output feedback voltage and the second input terminal receives a first reference voltage and the droop current,
   wherein the droop current generation circuit further comprises:
   a current mirror replicating a plurality of droop currents according to a setting signal and outputting the plurality of droop currents; and
   an analog-to-digital converter coupled between the droop parameter setting pin and the current mirror and generating the setting signal to the current mirror according to a setting voltage of the droop parameter setting pin.

2. The DC-DC converting controller of claim 1, wherein the droop current generation circuit further comprises an internal droop parameter setting circuit, a first terminal of the internal droop parameter setting circuit is coupled to the second input terminal of the error amplifier and a second terminal of the internal droop parameter setting circuit receives the droop current and generates the first reference voltage at the the first terminal of the internal droop parameter setting circuit.

3. The DC-DC converting controller of claim 1, further comprising:
   a first current sensing pin sensing a first output current;
   a current summing circuit, coupled to the first current sensing pin and the current sensing circuit, configured to generate a summed current according to the first output current; and
   a current output pin, coupled to the current summing circuit, configured to output the summed current.

4. The DC-DC converting controller of claim 3, wherein the current output pin is coupled to a thermistor to provide temperature compensation.

5. The DC-DC converting controller of claim 4, further comprising:
   an output reference pin coupled to the current summing circuit and the thermistor respectively.

6. The DC-DC converting controller of claim 3, further comprising:
   a second current sensing pin configured to sense a second output current, the current summing circuit also being coupled to the second current sensing pin and configured to generate the summed current according to the first output current and the second output current.

7. The DC-DC converting controller of claim 3, wherein the current summing circuit comprises a first voltage follower, and the first voltage follower comprises a first input terminal, a second input terminal and an output terminal, the second input terminal is coupled to the current output pin, the first input terminal is coupled to the output terminal, and the output terminal is coupled to the droop current generation circuit.

8. The DC-DC converting controller of claim 7, wherein the current summing circuit comprises a second voltage follower, and the second voltage follower comprises a first input terminal, a second input terminal and an output terminal, the input terminal is coupled to a second reference voltage, the first input terminal is coupled to the output terminal and the droop current generation circuit, and the output terminal is coupled to an output reference pin.

9. The DC-DC converting controller of claim 1, wherein the error amplifier generates a compensation signal according to the output feedback voltage and the first reference voltage.

10. A DC-DC converting controller, comprising:
    a current sensing circuit configured to provide a sensing current;
    a droop parameter setting pin coupled to an external droop parameter setting circuit;
    a droop current generation circuit coupled to the current sensing circuit and the droop parameter setting pin, wherein the droop current generation circuit is configured to generate a droop current according to the external droop parameter setting circuit and the sensing current; and
    an error amplifier comprising a first input terminal and a second input terminal, wherein the first input terminal receives an output feedback voltage and the second input terminal receives a first reference voltage and the droop current,
    wherein the droop current generation circuit further comprises:
    a current mirror replicating a plurality of droop currents according to a setting signal and outputting the plurality of droop currents; and
    a look-up table, cooperated with the droop current generation circuit to generate the setting signal to the current mirror according to a setting voltage of the droop parameter setting pin.

* * * * *